No. 811,296. PATENTED JAN. 30, 1906.
M. M. HOWLAND.
PNEUMATIC SPRING FOR VEHICLES.
APPLICATION FILED MAY 11, 1905.
2 SHEETS—SHEET 1.
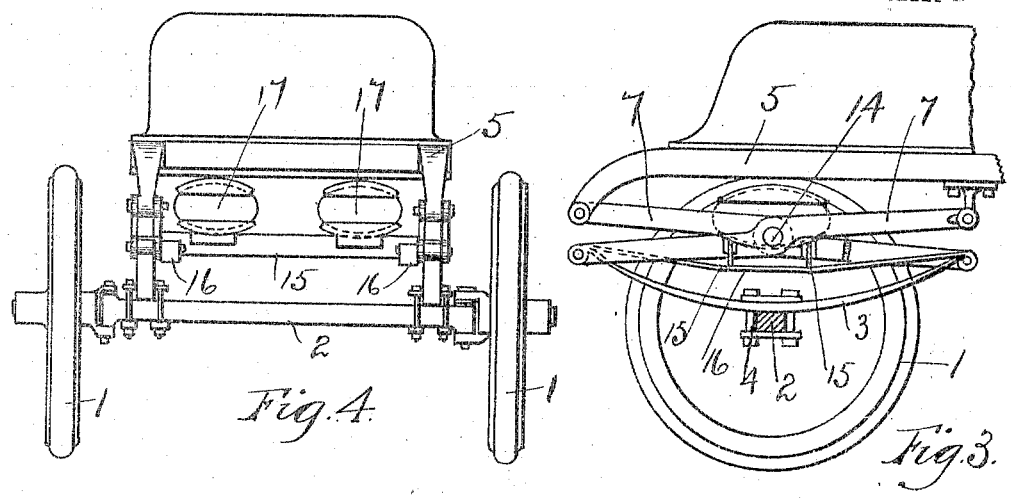
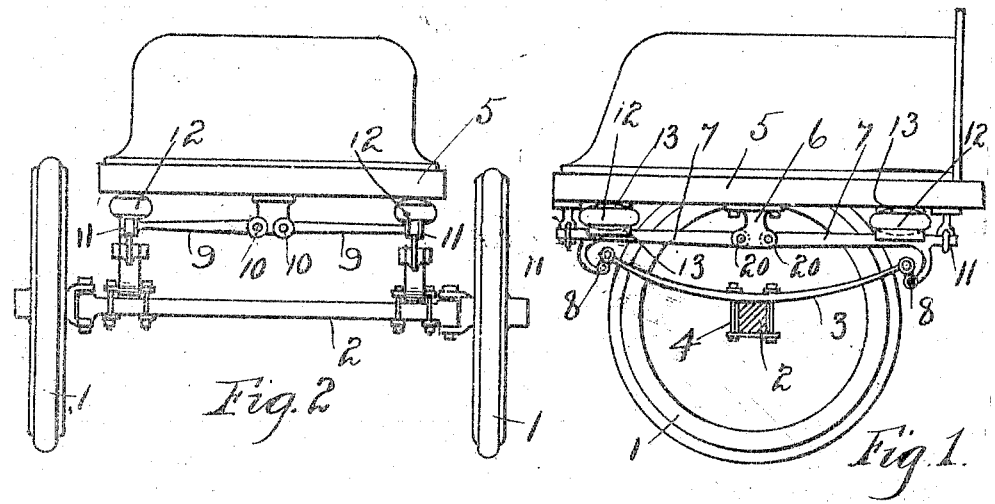
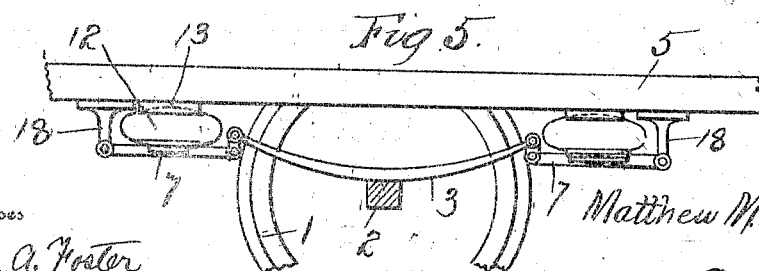
Witnesses
Frank A. Foster
E. J. Ogden
Inventor
Matthew M. Howland
By Howard E. Barlow
Attorney

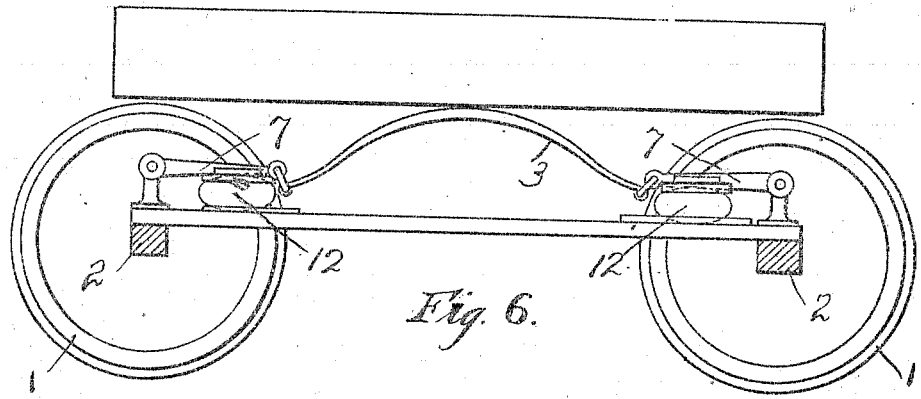
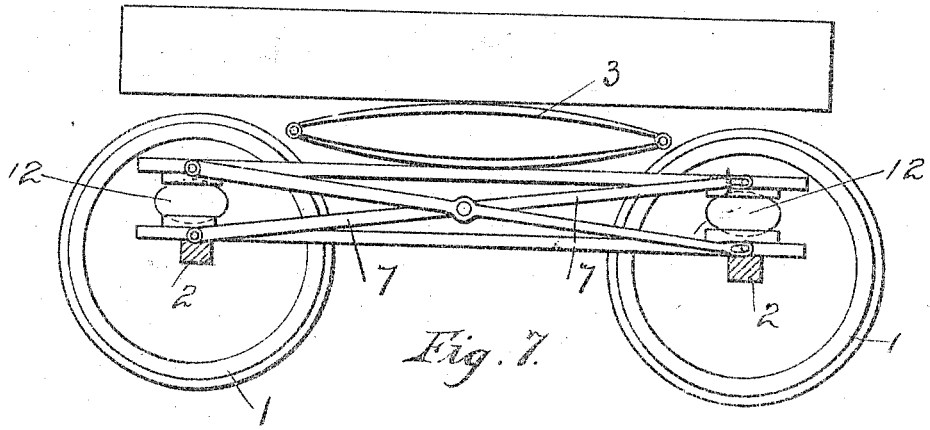

UNITED STATES PATENT OFFICE.

MATTHEW M. HOWLAND, OF PROVIDENCE, RHODE ISLAND, ASSIGNOR OF ONE-HALF TO WILLIAM W. DUNNELL, OF PROVIDENCE, RHODE ISLAND.

PNEUMATIC SPRING FOR VEHICLES.

No. 811,296.  Specification of Letters Patent.  Patented Jan. 30, 1906.

Application filed May 11, 1905. Serial No. 259,969.

*To all whom it may concern:*

Be it known that I, MATTHEW M. HOWLAND, a citizen of the United States, residing at the city of Providence, in the county of Providence and State of Rhode Island, have invented certain new and useful Improvements in Pneumatic Springs for Vehicles, of which the following is a specification, reference being had therein to the accompanying drawings.

This invention relates to the combination of pneumatic cushions and metal springs used as a means for supporting the body of a vehicle from its axle.

One object of my invention is to obviate the expensive and objectionable necessity of using pneumatic tires on heavy vehicles, such as automobiles and the like, as such tires are continually wearing out, becoming punctured or leaking from other causes, and becoming deflated, which, to say the least, is exceedingly annoying, as well as expensive.

By the use of my improved device all the ease and comfort desired may be obtained by having solid rubber tires on the wheels and using the same in combination with my special means of floating the vehicle-body on cushions of air, which cushions when used in combination with steel supporting-springs absorb all of the shocks and jars received from the road-bed before they reach the occupants of the vehicle.

The arrangement of my mechanism is not only applicable to automobiles, motor-cycles, and all self-propelling vehicles, carriages drawn by horses, bicycles, and the like, but it is also well adapted and may be used on railroad-coaches or any other vehicle to absorb the shocks and jars of the wheels passing over the road-bed, and thereby adding greatly to the comfort of the passengers, as well as to relieving the driving mechanism of the wear and tear due to such shocks and jars.

This invention provides a simple, easy, and effective method for using pneumatic cushions other than tires in conjunction with ordinary metal springs to reduce or absorb the shocks and vibrations sustained by a vehicle when in motion. To accomplish this in a practical manner, it is necessary that the running-gear should be attached to the body of the vehicle in such a way as to give all the rigidity needed to withstand severe longitudinal and lateral strains and at the same time to allow perfect freedom of vertical motion to the vehicle-body within proper limits. To accomplish this object, I have provided a set of yielding members or links, which may be hinged or otherwise flexibly connected to the body of the vehicle. These links may be connected at each side of the body with the springs in such a way as to allow for the expansion of said springs when under pressure. Pneumatic cushions are interposed between the running-gear and the body of the vehicle and operatively connected to the said yielding members in such manner as to prevent longitudinal and lateral motion. By "operatively connected" I mean so connected as to allow said cushions to perform all the functions for which intended, even though the necessities of construction might require the connection to be indirect—such, for example, as the form illustrated in Fig. 4 of the drawings. To secure additional rigidity, if it is needed, transverse yielding members or links may also be connected with the longitudinal links, thereby giving them great stability and at the same time allowing all the freedom of motion necessary. If desired, the said yielding members or links may be composed of several parts joined together after the manner of tongs to give both the rigidity and flexibility needed. In all cases there are a variety of positions in which the pneumatic cushions can be placed so that the pressure of the load may be transmitted through them to the springs, or the pressure may be transmitted through the springs to the cushions, if desired, in which latter case the cushions would be beneath the spring and nearest the axles of a vehicle. One advantage of this construction is that, while the body rests upon the cushions when inflated, if for any reason the cushions become deflated the body will then merely settle a short distance and be carried securely by the springs without the interposition of the pneumatic cushion.

The invention consists of other novel features and parts and combinations of the same, as will be fully described hereinafter and then pointed out in the appended claims.

A practical embodiment of the invention is represented in the accompanying drawings, forming a part of this specification, in which similar characters of reference indicate corresponding parts in all the views.

In the drawings, Figure 1 represents the side elevation of a portion of the frame of a vehicle, showing one arrangement of the pneumatic cushion and the metal spring working in conjunction with each other, said cushions being supported on yielding members. Fig. 2 is a front elevation of a vehicle, showing another view of the arrangement of mechanism and manner of supporting the cushions illustrated in Fig. 1. Fig. 3 illustrates the yielding members as composed of several parts and joined together after the manner of tongs or shears. Fig. 4 is a front elevation of the mechanism shown in Fig. 3. Fig. 5 is a modification or simplified form of the yielding members, pneumatic cushion, and metal spring in position to support a vehicle-body from the axle. Fig. 6 shows the side elevation of a vehicle in outline and represents the body portion resting on the metal springs 3 and said springs in turn as being supported on pneumatic cushions 12 12 through the yielding members 7 7. Fig. 7 shows a modification illustrating another arrangement of parts whereby the pneumatic cushions may be placed between the springs and the axles.

Referring to the drawings, at 1 1 are the vehicle-wheels, which in the case of automobiles are preferably equipped with solid rubber tires. At 2 is the axle on which the wheels are mounted.

A simple construction illustrating the principle of my invention is shown in Fig. 1, in which is represented an ordinary steel bow-spring 3, supported on the axle 2 and connected thereto in the usual way with straps and bolts 4. At 5 is the frame of the vehicle, to the under side of which is bolted the bracket 6. At 7 7 are two members or links, each pivoted at one end at 20 20 to said bracket, one member extending forward and one extending backward toward the ends of the vehicle. The free end of each of these pivoted members is supported on and connected with one end of the spring 3, which connection may be made in any usual or convenient manner to accommodate the elongation of this spring when compressed. These members thus hinged and supported are adapted to swing and yield with the vertical movements of the frame or body of the vehicle. To further support or brace the free ends of these yielding members, transverse links 9 9 have been provided and are hinged at 10 10 at one end and loosely connected at their opposite ends 11 11 to the free ends of said yielding members 7 7, thereby bracing said members against lateral strains and at the same time allowing a perfect freedom of vertical motion to the body of the vehicle within the desired limits.

Between the frame of the vehicle and the free ends of each of the yielding members 7 7 is placed a pneumatic cushion 12 12. These cushions may be supported in any suitable manner; but I have shown saucer-shaped plates 13 13 both above and below the same resting against the frame and also against the yielding members. These cushions may be of any size or shape and may be inflated in any desired manner.

Illustrated in Fig. 3 is another form of connecting up the yielding members 7 7, one end of each of these members being hinged to the body or load-supporting portion of the vehicle and the opposite end connected to the bow-spring 3, as in Fig. 1; but, unlike Fig. 1, the members cross at their middle portion and are pivoted together at 14 to work like a pair of tongs. Cross-bars 15 15 (see Fig. 4) extend across the vehicle from one pair of springs to the other and are supported on suitable hangers 16. On these cross-bars are held the pneumatic cushions 17 17, that support the weight of the forward end of the vehicle, and a similar set may be arranged for the rear end also.

Fig. 5 illustrates a simple form of the device in which the yielding members 7 7 are made short and extend outward each way beyond the ends of the bow-spring 3, to which spring they are connected, the outer end of each member being hinged to the body of the vehicle through the brackets 18 18.

My invention is not restricted to the precise construction and arrangement of parts herein shown and described, nor to the various details thereof, as the same may be modified or rearranged in various particulars without departing from the spirit and scope of my invention.

The large surface of the cushions on which the body rests as compared to the resting-surface of a pneumatic tire, will allow of a much lower pressure being used in said cushions than is required in the tires to support the weight, and thus these cushions will be more sensitive to jars and shocks than where the pressure used is many times greater.

Another feature of the invention is that before a cushion can be compressed to the bursting-point the body will rest on the solid parts connecting with the springs.

One essential advantage of this device is that it can be fitted to a great variety of vehicles without making any radical change in their forms. In place of the hinged connections it is possible in some cases to use light springs too weak to transmit a jar, but at the same time giving rigidity in the directions needed. This arrangement may be used on any light-running vehicle and in supporting the saddle of a bicycle, if desired.

Having thus described my invention, what I claim as new, and desire to secure by Letters Patent, is—

1. An improvement in vehicles comprising a vehicle-body, running-gear therefor including springs, pneumatic cushions, yieldable means engaging said cushions and connecting said body with said running-gear to prevent longitudinal motion on the parts and yieldable means to prevent lateral motion on the parts.

2. An improvement in vehicles comprising a vehicle-body, running-gear therefor, pneumatic cushions and springs interposed between said running-gear and body, and yieldable means operatively connected to said cushions to prevent longitudinal and lateral motion of said body on said cushions.

3. An improvement in vehicles comprising a vehicle-body, running-gear therefor, pneumatic cushions and metal springs interposed between said running-gear and body, and pivoted members operatively connected to said cushions for preventing longitudinal and lateral motion of said body on the cushions.

4. An improvement in vehicles comprising a vehicle-body, springs therefor, pivoted members supported by said body and interposed between said springs and said body, and pneumatic cushions interposed between said pivoted members and said body.

5. An improvement in vehicles comprising a vehicle-body, running-gear therefor, springs carried by said running-gear, pivoted members supported by said body and interposed between said springs and said body, and pneumatic cushions interposed between said pivoted members and said body.

6. An improvement in vehicles comprising a vehicle-body, running-gear therefor, pneumatic cushions and springs interposed between said running-gear and said body, and members pivoted at one end to said body and having their free ends connected to said springs, said members being operatively connected with said cushions, whereby lateral and longitudinal play of said body is prevented.

7. An improvement in vehicles comprising a vehicle-body, springs therefor, members pivoted at one end to said body and having their free ends connected to said springs, and pneumatic cushions interposed between said pivoted members and said vehicle-body.

8. An improvement in vehicles comprising a vehicle-body, springs therefor, pivoted members supported by said body and interposed between said springs and said body to prevent longitudinal play of the parts, pneumatic cushions interposed between said pivoted members and said vehicle-body, and means connected to said pivoted members to prevent lateral play on the parts.

9. An improvement in vehicles comprising a vehicle-body, springs therefor, depending brackets carried by said body, members pivotally mounted at one end in said brackets and having their free ends connected to said springs, and pneumatic cushions interposed between said vehicle-body and the free ends of said members.

10. An improvement in vehicles comprising a vehicle-body, running-gear therefor, pneumatic cushions and springs interposed between said running-gear and body, depending brackets carried by said body, members pivotally supported at one end in said brackets and having their free ends connected to said springs, said members being operatively connected with said cushions, and means connected to the free ends of said pivoted members to prevent lateral play of the parts.

11. In a vehicle, the combination with the vehicle-body, metal springs, means for supporting said springs from the running-gear of the vehicle, yielding members hinged at one end to said body and connected at their opposite ends with said springs, and pneumatic cushions interposed between said members and the vehicle-body.

12. In a vehicle, the combination with the vehicle-body, the vehicle running-gear, metal springs, means for supporting said springs from said running-gear, yielding members hinged to said vehicle-body and connected at their opposite ends with said springs, means for supporting the yielding ends of said members against lateral strains, and pneumatic cushions interposed between said members and vehicle-body.

In testimony whereof I affix my signature in presence of two witnesses.

MATTHEW M. HOWLAND.

Witnesses:
HOWARD E. BARLOW,
E. I. OGDEN.